US009769175B2

(12) United States Patent
Bacher et al.

(10) Patent No.: US 9,769,175 B2
(45) Date of Patent: *Sep. 19, 2017

(54) ACCESSING PRIVILEGED OBJECTS IN A SERVER ENVIRONMENT

(71) Applicant: INTERNATIONAL BUSINESS MACHINES CORPORATION, Armonk, NY (US)

(72) Inventors: Utz Bacher, Boeblingen (DE); Frank Blaschka, Boeblingen (DE); Einar Lueck, Boeblingen (DE); Christoph Raisch, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,558

(22) Filed: Oct. 5, 2015

(65) Prior Publication Data
US 2016/0036823 A1 Feb. 4, 2016

Related U.S. Application Data

(63) Continuation of application No. 14/064,817, filed on Oct. 28, 2013, now Pat. No. 9,230,110.

(30) Foreign Application Priority Data

Oct. 29, 2012 (GB) .................................. 1219367.8

(51) Int. Cl.
*G06F 7/04* (2006.01)
*G06F 15/16* (2006.01)
(Continued)

(52) U.S. Cl.
CPC ............ *H04L 63/102* (2013.01); *G06F 9/468* (2013.01); *G06F 21/57* (2013.01); *G06F 21/74* (2013.01); *G06F 2221/2145* (2013.01)

(58) Field of Classification Search
CPC ...................................................... G06F 21/57
(Continued)

(56) References Cited

U.S. PATENT DOCUMENTS 5,371,890 A    12/1994  Bozman et al.
7,139,832 B2   11/2006  Kameyama et al.
(Continued)

FOREIGN PATENT DOCUMENTS

WO    2006095184 A2    9/2006
WO    2007025850 A1    3/2007

OTHER PUBLICATIONS

Office Action in U.S. Appl. No. 14/064,817 dated Dec. 1, 2014, pp. 1-19.
(Continued)

*Primary Examiner* — Taghi Arani
*Assistant Examiner* — Khalil Naghdali
(74) *Attorney, Agent, or Firm* — Steven Chiu; Matthew M. Hulihan; Heslin Rothenberg Farley & Mesiti PC

(57) ABSTRACT

Accessing privileged objects in a server environment. A privileged object is associated with an application comprising at least one process resource and a corresponding semi-privileged instruction. The association is filed in an entity of an operating system kernel. A central processing unit (CPU) performs an authorization check if the semi-privileged instruction is issued and attempts to access the privileged object. The CPU executes the semi-privileged instruction and grants access to the privileged object if the operating system kernel has issued the semi-privileged instruction; or accesses the entity if a process resource of the application has issued the semi-privileged instruction to determine authorization of the process resource to access the privileged object. Upon positive authorization the CPU executes the semi-privileged instruction and grants access to
(Continued)

the privileged object, and upon authorization failure denies execution of the semi-privileged instruction and performs a corresponding authorization check failure handling.

14 Claims, 6 Drawing Sheets

(51) Int. Cl.
    *G06F 17/30*     (2006.01)
    *H04L 29/06*     (2006.01)
    *G06F 21/57*     (2013.01)
    *G06F 21/74*     (2013.01)
    *G06F 9/46*     (2006.01)

(58) Field of Classification Search
    USPC .............................................................. 726/4
    See application file for complete search history.

(56) References Cited

U.S. PATENT DOCUMENTS

| | | |
|---|---|---|
| 8,639,625 B1 | 1/2014 | Ginter et al. |
| 2009/0265353 A1 | 10/2009 | Vaddagiri |
| 2010/0031360 A1 | 2/2010 | Seshadri et al. |
| 2010/0228936 A1* | 9/2010 | Wright ................ G06F 12/1009 711/163 |
| 2013/0036448 A1 | 2/2013 | Aciicmez et al. |

OTHER PUBLICATIONS

Final Office Action in U.S. Appl. No. 14/064,817 dated Jun. 1, 2015, pp. 1-22.
Notice of Allowance in U.S. Appl. No. 14/064,817 dated Aug. 28, 2015, pp. 1-75.

* cited by examiner

ACCESSING PRIVILEGED OBJECTS IN A SERVER ENVIRONMENT

CROSS REFERENCE TO RELATED APPLICATIONS

This application is a continuation of U.S. patent application Ser. No. 14/064,817 filed Oct. 28, 2013 entitled, "ACCESSING PRIVILEGED OBJECTS IN A SERVER ENVIRONMENT", which claims priority from United Kingdom patent application number 1219367.8, filed Oct. 29, 2012, both of which are hereby incorporated herein by reference in their entirety.

BACKGROUND

One or more aspects of the present invention relate in general to the field of server environments, and in particular, to accessing privileged objects in a server environment and a corresponding server environment.

Network communication is usually offered by an operating system kernel through a socket interface. All calls for creating and manipulating the sockets as well as inbound and outbound data transfer are handed to the operating system kernel via system calls. The operating system kernel has code to process these requests.

Performance of today's networking communication is impacted by data transfer overhead and system call overhead. Semi-privileged instruction can help to drive traffic from user space, but have a static association with an application at best, e.g. the semi-privileged instruction can identify the application and perform data transfers, but still fails to operate in a parent/child process paradigm, where a socket connection can be used by the parent process or the child process after forking. If kernel operations like splice, sendfile etc. are to be performed, the semi-privileged call from user space does not apply or requires superfluous copies from kernel space to user space and use such instructions from there.

For high speed communication, it is beneficial to use instructions directly from user space to exchange data. While socket creation takes place in the operating system kernel, data can be sent and received without having to call the operating system kernel through expensive system call interfaces. The code to send and receive data is in user space libraries which exploit special hardware instructions to initiate data transfers. This introduces an authorization issue. The data transfer instructions are semi-privileged to prevent that processes can interfere with sockets of other processes. Semi-privileged instructions perform some sort of authorization check in the firmware. For instance, a token could be associated with a socket, and the token is also associated with the current process. The operating system scheduler ensures that the token associated by the process is available to the firmware to perform the authorization checks. For instance, the process identification value could be written to a specific location in memory to which only the kernel has write access, to allow firmware to check whether the current process is authorized to operate on a socket. On System z, an address space control element (ASCE) can be used, too. If the current context is the operating system kernel itself, authorization will always succeed.

This scheme of using semi-privileged instruction for data transfers exhibits several issues. It does not cover the fork paradigm of Unix-like operating systems. Usually, application processes establish connections, then the processes fork and the child process continues to use the established connection. As the operating system does not know whether the child process will really continue to use the connection socket, or the parent process will continue to use it, it does not know, which token should be associated with the socket and usually, only one token is used for authorizing purposes, so a list of tokens for the child process and the parent process is not possible. In the traditional way of handling such cases in the operating system kernel, the connection socket will be open for both processes, so the authorization check of the socket code will succeed. With the use of semi-privileged instructions a blocking transfer (write/read) conflict arises, so the process needs to be put aside. Polling around semi-privileged transfers instructions would greatly increase CPU (Central Processing Unit) consumption. A select call, respectively poll or epoll, is a way for applications to get notification if something like incoming data happens to a connection socket. Several sockets are watched simultaneously, and as soon as one of the observed sockets are worthwhile further consideration, the select call returns, indicating, which of the observed sockets experienced a state change. When semi-privileged instructions are used to operate on sockets, a method is required to enable applications to call select on several sockets, passing on "select" processing to the operating system kernel. Extensions to the networking stack in the operating system, like sendfile and splice operations, transfer data directly from other files or data streams in the kernel space, without having to route data to an application process which passes it back for sending out over the network, greatly reducing CPU consumption. However, when the data transfer takes place in user space through semi-privileged instructions, data has to be read from files or streams and passed on to user space for transmission.

In the U.S. Pat. No. 7,139,832 B2 "DATA TRANSFER AND INTERMISSION BETWEEN PARENT AND CHILD PROCESS" by Kameyama et al., which is hereby incorporated herein by reference in its entirety, a data transfer method is disclosed realizing a function similar to UNIX's fork function. The disclosed data transfer method allows a parent process on a server to issue a request for intermission of communication to a process on a client and allows the process on the client to issue a report of completion of intermission. Further the data transfer method allows the parent process to issue, to a child process created on the server and the process on the client, a request for establishment of a new communication line connection between them. If the parent process has received data from the process on the client before the establishment of the new connection, the data is copied to the child process. According to the disclosed data transfer method a child process cannot access the memory and connection(s) of the parent process. Therefore, a second connection is established. An emulation layer on both sides hides the fact that two connections are used. This approach carries the drawbacks, that code changes are required on both sides of the network, e.g. need to change a client in the Internet which wants to read from an enabled web server. Further two connections need to be established, which results in latency and increased resource consumption. Also coordination of those two connections is additional overhead. The use of two connections adds complexity to diagnostics and its procedures and needs to add changes to diagnostics tools. Even with the use of semi-privileged instructions, two connections will have to be employed, with the above mentioned disadvantages. Also kernel-level operations, such as splice and sendfile are not considered.

BRIEF SUMMARY

A technical problem underlying an aspect of the present invention is to provide a method for accessing privileged objects in a server environment and another server environment, which are able to speed up network communication by reducing data transfer overhead and/or system call overhead and to solve the above mentioned shortcomings and pain points of prior art network communication.

Accordingly, in an embodiment, a capability for accessing privileged objects in a server environment by means of a semi-privileged instruction is provided that includes, for instance: associating a privileged object with an application comprising at least one process resource and a corresponding semi-privileged instruction; filing the association in an entity of an operating system kernel; wherein a central processing unit performs an authorization check if the semi-privileged instruction is issued and attempts to access the privileged object; wherein the central processing unit executes the semi-privileged instruction and grants access to the privileged object if the operating system kernel has issued the semi-privileged instruction; or accesses the operating system kernel entity if a process resource of the application has issued the semi-privileged instruction to determine authorization of the application process resource to access the privileged object. Upon positive authorization the central processing unit executes the semi-privileged instruction and grants access to the privileged object, and upon authorization failure the central processing unit denies execution of the semi-privileged instruction and performs a corresponding authorization check failure handling.

The above, as well as additional purposes, features, and advantages of the present invention will become apparent in the following detailed written description.

BRIEF DESCRIPTION OF THE SEVERAL VIEWS OF THE DRAWINGS

One embodiment of the present invention, as described in detail below, is shown in the drawings, in which.

DETAILED DESCRIPTION

Figure 1:
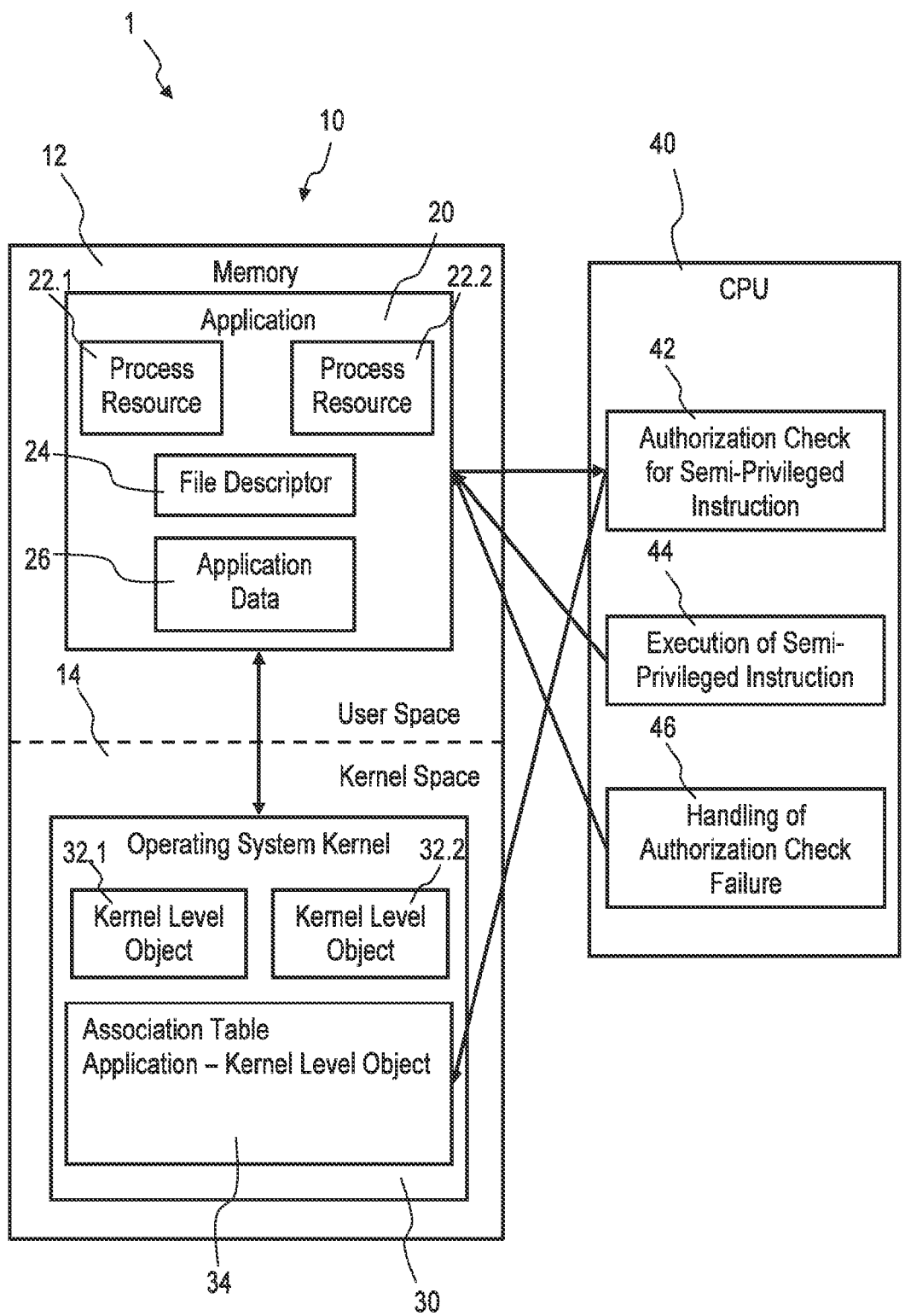
FIG. 1 is a schematic block diagram of a server environment performing a semi-privileged instruction issued by an application process resource, in accordance with a first embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
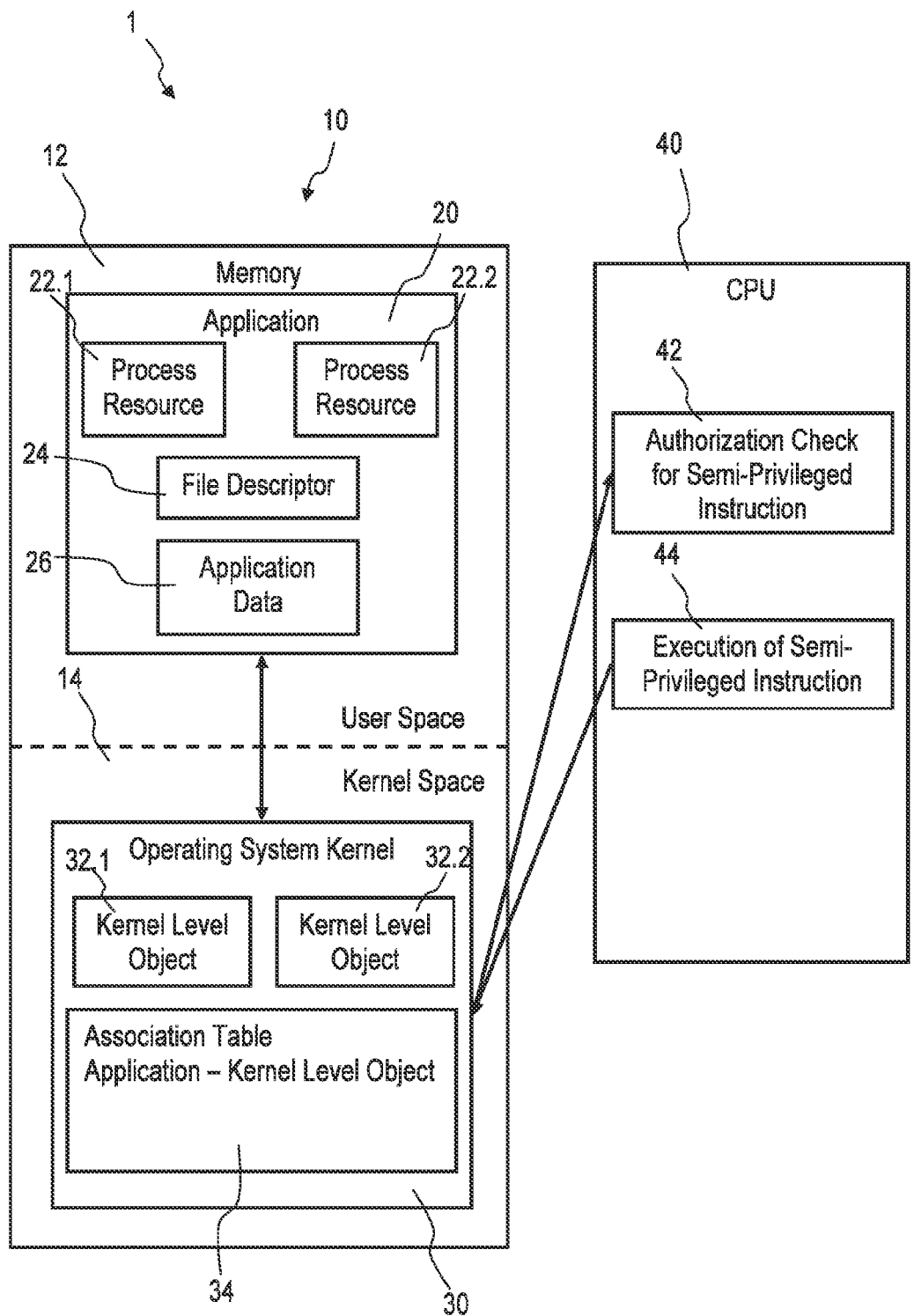
FIG. 2 is a schematic block diagram of the server environment of FIG. 1 performing a semi-privileged instruction issued by an operating system kernel, in accordance with the first embodiment of the present invention.
Figure 3:
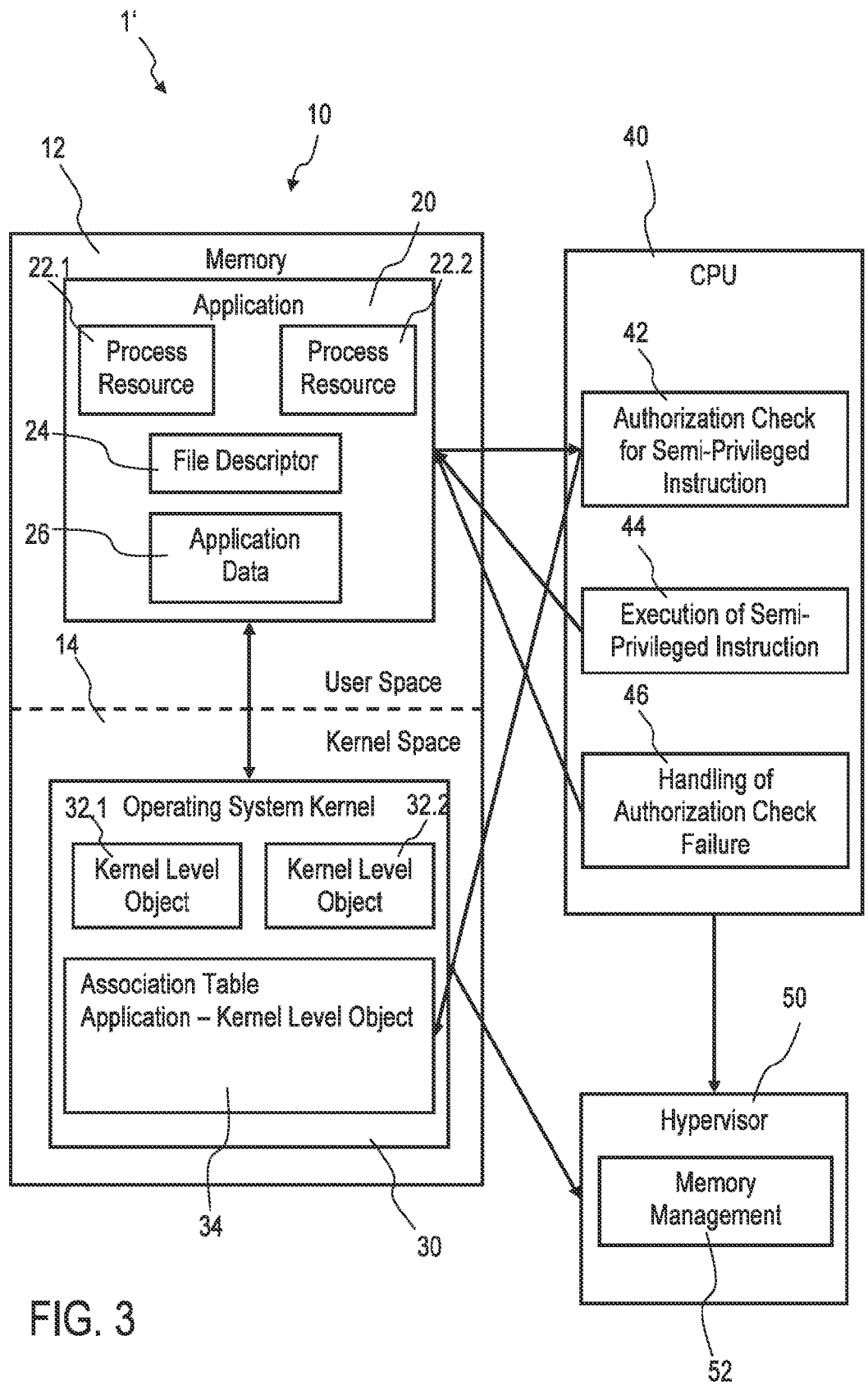
FIG. 3 is a schematic block diagram of a server environment performing a semi-privileged instruction issued by an application process resource, in accordance with a second embodiment of the present invention.

FIG. 1 shows a server environment 1 performing a semi-privileged instruction issued by an application process resource 22.1, 22.2, in accordance with a first embodiment; and FIG. 2 shows the server environment 1 of FIG. 1 performing a semi-privileged instruction issued by an operating system kernel 30, in accordance with the first embodiment. FIG. 3 shows a server environment 1' performing a semi-privileged instruction issued by an application process resource 22.1, 22.2, in accordance with a second embodiment.

Referring to FIGS. 1 and 2, the shown embodiment employs a server environment 1 with a central processing unit 40 and a memory 10 comprising user space 12 and kernel space 14. The kernel space 14 provides an operating system kernel 30 and the user space 12 provides at least one application 20 comprising at least one process resource 22.1, 22.2 accessing privileged objects 32.1, 32.2 of the operating system kernel 30 by means of a semi-privileged instruction.

Referring to FIG. 3, the shown embodiment employs a virtual server environment 1' comprising the same components as the server environment 1 shown in FIGS. 1 and 2. Additional to the central processing unit 40 and the memory 10, the virtual server environment 1' comprises a hypervisor 50 for memory management 52, ensuring that the central processing unit 40 can access data, for example application data 26, to be transferred. Analogous to the server environment 1 of FIG. 1 the memory 10 of the virtual server environment 1' comprises user space 12 and kernel space 14. The kernel space 14 provides an operating system kernel 30 and the user space 12 provides at least one application 20 comprising at least one process resource 22.1, 22.2 accessing privileged objects 32.1, 32.2 of the operating system kernel 30 by means of a semi-privileged instruction. The operating system kernel 30 notifies the hypervisor 50 of potential use of semi-privileged instructions by application process resources 22.1, 22.2. The central processing unit 40 requests resolution of memory access failures from the hypervisor 50.

In both embodiments, a corresponding privileged object 32.1, 32.2 is associated with at least one application 20 comprising at least one process resource 22.1, 22.2 and the corresponding semi-privileged instruction to access the privileged objects 32.1, 32.2 of the operating system kernel 30 by the semi-privileged instruction. The association is filed in an entity 34 of the operating system kernel 30. The central processing unit 40 performs an authorization check 42 if the semi-privileged instruction is issued and attempts to access the privileged object 32.1, 32.2. The central processing unit 40 executes the semi-privileged instruction in Block 44 and grants access to the privileged object 32.1, 32.2 if the operating system kernel 30 has issued the semi-privileged instruction as shown in FIG. 2.

The central processing unit 40 accesses the operating system kernel entity 34 to perform the Authorization Check 42 if a process resource 22.1, 22.2 of the application 20 has issued the semi-privileged instruction to determine authorization of the application process resource 22.1, 22.2 to access the privileged object 32.1, 32.2, as shown in FIGS. 1 and 3. Upon positive authorization the central processing unit 40 executes the semi-privileged instruction in Block 44, e.g. operates on application data 26, and grants access to the privileged object 32.1, 32.2.

Upon authorization failure the central processing unit 40 denies execution of the semi-privileged instruction and performs a corresponding authorization check failure handling in Block 46.

In both embodiments the application process resource 22.1, 22.2 requests access to the privileged object 32.1, 32.2 from the operating system kernel 30 in reaction to a first error code created during authorization check failure handling 46. The operating system kernel 30 verifies if one process resource 22.1, 22.2 of the corresponding application 20 has access to that privileged object 32.1, 32.2. Upon positive verification the operating system kernel 30 establishes association of the requesting process resource 22.1, 22.2 with the privileged object 32.1, 32.2 and the semi-privileged instruction in the operating system kernel entity 34. The requesting application process resource 22.1, 22.2 repeats previous steps for attempting access to the privileged object 32.1, 32.2 through the semi-privileged instruction. Upon negative verification the operating system kernel 30 denies access to the privileged object and returns a corresponding second error code to the application process resource 22.1, 22.2.

In the shown embodiments the operating system entity 34 comprises an associating table containing at least one association tuple of an application process resource and a privileged object. The privileged object 32.1, 32.2 consists of an operating system kernel-level object including a socket connection and/or a disk device and/or an access to an input/output bus, an input/output device and/or an input/output channel, for example.

Additionally a file descriptor 24 is provided to the application 20 representing a data transfer connection established to be used by the semi-privileged instruction to transfer data to a target location.

Figure 4:
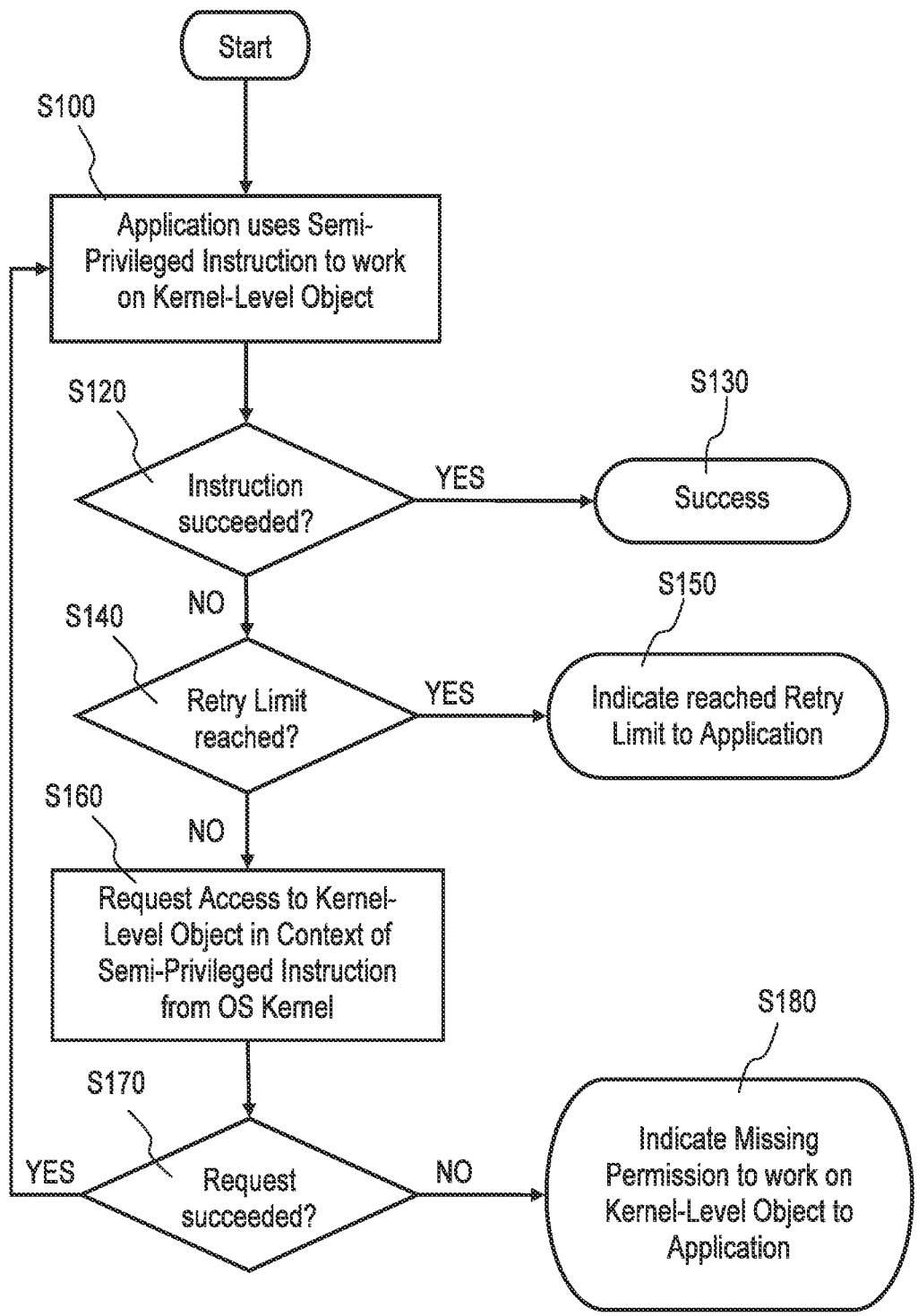
FIG. 4 is a schematic flow diagram of an application process using a semi-privileged instruction for working on kernel-level objects, in accordance with an embodiment of the present invention.
Figure 5:
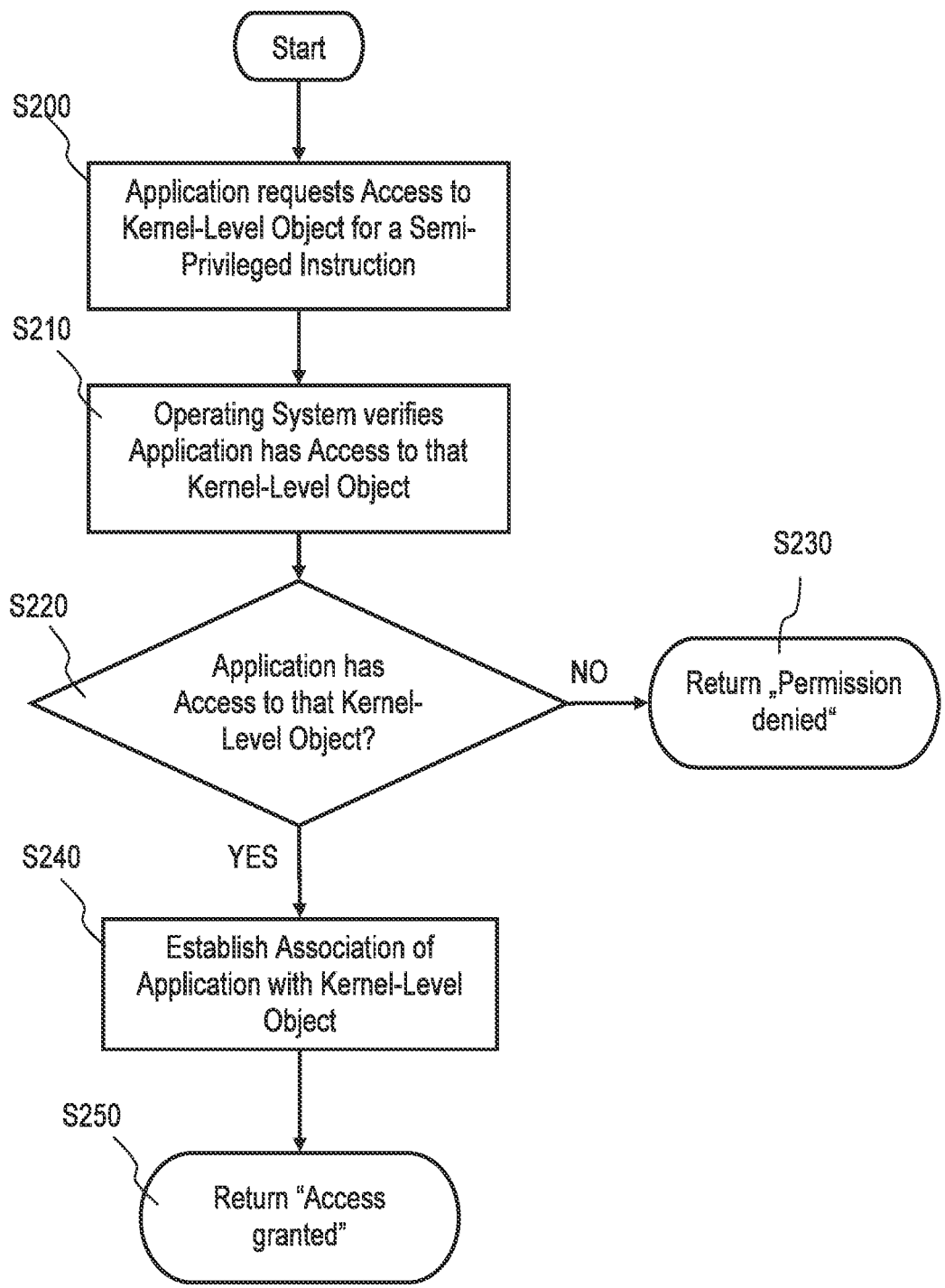
FIG. 5 is a schematic flow diagram of an authorization request process, in accordance with an embodiment of the present invention.

FIG. 4 shows an application process using a semi-privileged instruction for working on kernel-level objects 32.1, 32.2, in accordance with an embodiment of the present invention; FIG. 5 shows an authorization request process, in accordance with an embodiment of the present invention; and FIG. 6 shows an execution process of an implemented semi-privileged instruction, in accordance with an embodiment of the present invention.

Referring to FIG. 4, the application 20 uses a semi-privileged instruction to work on a kernel-level object 32.1, 32.2 in step S100. If the execution of the semi-privileged instruction succeeds in step S120, the successful execution of the semi-privileged instruction is reported to the application 20 in step S130. If the semi-privileged instruction is not successfully executed in step S120, it is checked in step S140, if a predefined retry level is reached. If the predefined retry level is reached, the application 20 is informed in step S150. If the predefined retry level is not reached, in step S160 the application 20 requests access to the kernel-level object 32.1, 32.2 from the operating system kernel 30 in context of the semi-privileged instruction. In step S170 it is checked, if the request has succeeded. If the request has succeeded, the process returns to step S100. If the request has not succeeded, the missing permission to work on the kernel-level object 32.1, 32.2 is indicated to the requesting application 20 in step S180.

Referring to FIG. 5, in step S200 the application 20 requests access to a kernel-level object 32.1, 32.2 to execute a corresponding semi-privileged instruction. In step S210, the operating system kernel 30 verifies that the application 20 has access to that kernel-level object 32.1, 32.2. If the application 20 has no access to the kernel-level object 32.1, 32.2 step S220 goes to step 230 to return the information "Permission denied" to the requesting application 20. If the application 20 has access to the kernel-level object 32.1, 32.2 step S220 goes to step 240 to establish the association of the application 20 with the kernel-level object 32.1, 32.2. Step 250 returns the information "Access granted" to the requesting application 20.

Figure 6:
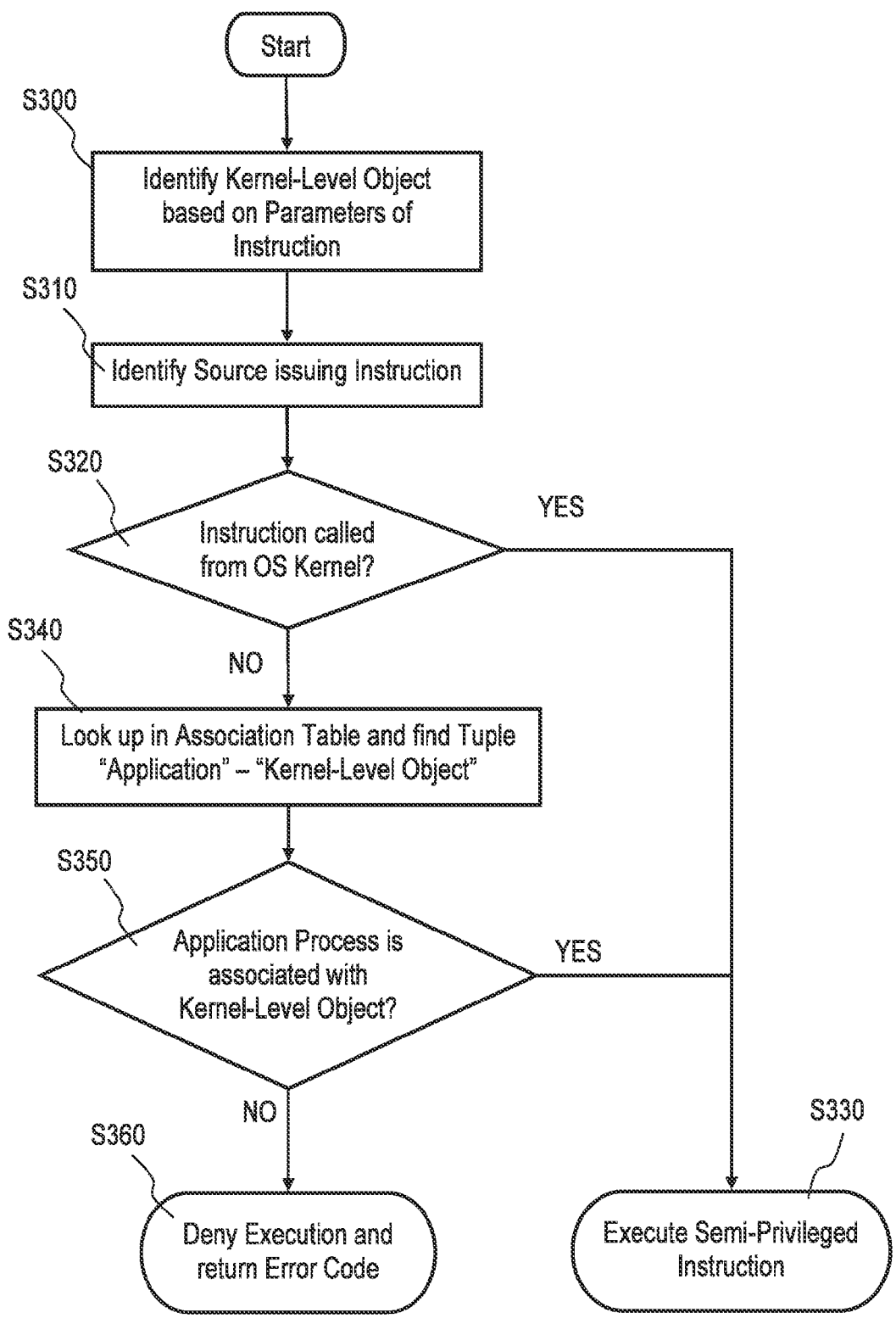
FIG. 6 is a schematic flow diagram of an execution process of an implemented semi-privileged instruction, in accordance with an embodiment of the present invention.

Referring to FIG. 6, the central processing unit 40 identifies the kernel-level object 32.1, 32.2 based on parameters of the semi-privileged instruction in step S300. In step S310 the central processing unit 40 identifies the source issuing the semi-privileged instruction. If the semi-privileged instruction is called from the operating system kernel 30, step S320 goes to step S330. The central processing unit 40 executes the semi-privileged instruction in step S330. If the semi-privileged instruction is not called from the operating system kernel 30, step S320 goes to step S340. The central processing unit 40 accesses the association table 34 in step S340, to find a tuple "Application"—"Kernel-Level Object" representing the assignment of the requesting application 20 with the corresponding kernel-level object 32.1, 32.2. If the requesting application 20 is associated with kernel-level object 32.1, 32.2, step S350 goes to step S330. The central processing unit 40 executes the semi-privileged instruction in step S330. If the requesting application 20 is not associated with kernel-level object 32.1, 32.2, step S350 goes to step S360. In step S360 the execution of the semi-privileged instruction is denied and the first error code is returned to the application 20.

According to embodiments of the present invention, for blocking operations, the operating system kernel 30 will be called to execute these blocking operations. Non-blocking data transfers are entirely done in user space 12. The file descriptor 24 will be used to block on. The file descriptor 24 represents the connection and is the TCP socket, for example, which has been used for connection establishment. User space library uses this file descriptor 24 to block on and to use select/poll/epoll operations on. Incoming data or other status changes to the connection, all delivered through interrupt triggered by peer, will wake up anyone waiting on the file descriptor 24, blocking user space 12 or select/poll/epoll operations. For the select/poll/epoll operations bitmaps and/or the file descriptor lists can be modified to translate between the connection socket as perceived by the application 20 and the file descriptor 24.

User space library calls operating system kernel 30, e.g. via character device, to trigger a splice/sendfile operation. Sendfile and splice operations are provided in the operating system kernel 30 and operate on files and streams for efficient data transfers e.g. in web servers. This kernel code is changed, so that as soon as a sendfile or splice operation is requested by an application 20, the data will be directly read from the requested source file and immediately pushed over the network though the semi-privileged instructions performing the corresponding data transfer. New kernel code performs the authorization checks, if the application 20 is allowed to read from the file. The new kernel code uses data of input file descriptor 24 and transfers the data directly to the destination. The semi-privileged instructions are called from the operating system kernel 30 and no authorization validation is performed by hardware/firmware, since the operating system kernel 30 is the source of the semi-privileged instructions, but authorization can and should be validated in the operating system kernel 30.

In case of a forking operation the operating system kernel 30 uses the file descriptor 24 to verify if the requesting process resource 22.1, 22.2 is authorized to use the data transfer connection. Also an interface between the application 20 and the operating system kernel 30 is provided to request association of a current process resource 22.1, 22.2 to a corresponding connection socket. The operating system kernel 30 validates the authorization of the requesting process resource 22.1, 22.2 corresponding to the file descriptor 24. If the requesting process resource 22.1, 22.2 is able to use the file descriptor 24, it is able to use the connection socket as privileged object 32.1, 32.2. Therefore the operating system kernel 30 updates the association of the privileged object 32.1, 32.2 to the requesting process resource 22.1, 22.2.

As described herein, in an embodiment, a method for accessing privileged objects in a server environment by means of a semi-privileged instruction is provides that includes, for instance: associating a privileged object with an application comprising at least one process resource and a corresponding semi-privileged instruction; filing the association in an entity of an operating system kernel; wherein a central processing unit performs an authorization check if the semi-privileged instruction is issued and attempts to access the privileged object; wherein the central processing unit executes the semi-privileged instruction and grants access to the privileged object if the operating system kernel has issued the semi-privileged instruction; or accesses the operating system kernel entity if a process resource of the application has issued the semi-privileged instruction to determine authorization of the application process resource to access the privileged object. Upon positive authorization the central processing unit executes the semi-privileged instruction and grants access to the privileged object, and upon authorization failure the central processing unit denies execution of the semi-privileged instruction and performs a corresponding authorization check failure handling.

In further embodiments, the application process resource requests access to the privileged object from the operating system kernel in reaction to a first error code created during authorization check failure handling; wherein the operating system kernel verifies if one process resource of the corresponding application has access to that privileged object. Upon positive verification the operating system kernel establishes association of the requesting process resource with the privileged object and the semi-privileged instruction in the operating system kernel entity; wherein the requesting application process resource repeats previous steps for attempting access to the privileged object through the semi-privileged instruction.

In further embodiments, upon negative verification the operating system kernel denies access to the privileged object and returns a corresponding second error code to the application process resource.

In further embodiments, the operating system entity comprises an associating table containing at least one association tuple of an application process resource and a privileged object.

In further embodiments, the privileged object consists of an operating system kernel-level object including at least one of the following components: A socket connection, a disk device or access to an input/output bus, an input/output device or an input/output channel.

In further embodiments, a file descriptor is provided to the application representing a data transfer connection established to be used by the semi-privileged instruction to transfer data to a target location.

In further embodiments, a user space library uses the file descriptor to block on and/or to use select and/or poll and/or epoll operations.

In further embodiments, in case of forking the operating system kernel uses the file descriptor to verify if the requesting process resource is authorized to use the data transfer connection.

In further embodiments, the operating system kernel uses said semi-privileged instruction to transfer data direct to said target location given by said file descriptor when a sendfile and/or splice operation is to be performed.

In another embodiment, a server environment comprises a central processing unit and a memory comprising user space and kernel space to perform the method for accessing privileged objects by means of a semi-privileged instruction described above. The kernel space provides an operating system kernel and the user space provides at least one application comprising at least one process resource accessing privileged objects of the operating system kernel by means of a semi-privileged instruction.

In further embodiments, the server environment is a virtual server environment comprising a hypervisor for memory management.

In further embodiments, the operating system kernel notifies the hypervisor of potential use of semi-privileged instructions by application process resources.

In further embodiments, the central processing unit requests resolution of memory access failures from the hypervisor.

In another embodiment, a data processing program for execution in a data processing system comprises software code portions for performing a method for accessing privileged objects in a server environment when the program is run on the data processing system.

In yet another embodiment, a computer program product stored on a computer-usable medium comprises computer-readable program means for causing a computer to perform a method for accessing privileged objects in a server environment when the program is run on the computer.

All in all, embodiments use semi-privileged instructions usually executed by application processes, but performing supervisor state actions previously not related to operating system concepts, to perform authorization check during execution by the processing unit.

One aspect of the innovation is that the authorization check of the semi-privileged instructions is moved from the operating system to the processing unit. So the authorization is directly checked during execution of the semi-privileged instruction. Through the association, semi-privileged instructions now have a means to decide whether an application calling the instruction is allowed to perform the instruction, or whether the instruction will deny execution due to insufficient rights, i.e. the association between application process and the operating system kernel-level object is missing.

Embodiments solve the prior art problems by a combination of user space and kernel space extensions. A file descriptor is introduced, allowing user space code to reference to a connection socket. The file descriptor represents the actual socket connection towards the user space library code interfacing to the application. Upon forking, a resulting child process will not be associated with the connection socket. The attempt to send or receive data will be rejected due to the semi-privileged nature of the instructions. In that case, the user space code requests to assign the connection token to the current process through a system call interface. The kernel code will check whether the child process has inherited the file descriptor and change the token to the current process or reject the requests. If it was not the child process but the parent process which continues to use the connection socket after forking, nothing will happen and the child process is not further related to this communication.

Blocking operations are handed to the operating system kernel, while the user space application blocks on an operation to the file descriptor. Select operations and their parameters need to be adapted so that notification on the communication socket will be processed like notifications on the file descriptor.

Sendfile and splice operations are performed in the operating system kernel to benefit adequately from these functions. While the application will call sendfile/splice on the file descriptor, kernel code will perform the actual sendfile/splice task so that no overhead occurs. The operating system kernel is able to execute semi-privileged operations without authorization checks; testing authorization is entirely subject to the operating system kernel in this respect.

Further, embodiments use semi-privileged instructions to transfer data over the network, avoiding system call overhead and data copies from user space to kernel space since data is directly used from user space. Authorization to sending within a connection is based on a process identified by a semi-privileged instruction. The operating system has associated a kernel-level object, i.e. the connection, which it has responsibility for, with the application process. Association is visible to the processing unit, so that semi-privileged instructions can verify authorization during execution.

If an application process is not allowed to send data, e.g. application process has forked, and a child process wants to use an existing connection, semi-privileged instructions will fail with an appropriate error code. Then the child process requests access to the kernel-level object from the operating system. The operating system verifies that the child process has inherited rights to access the socket connection and modifies the association. Now the child process is associated with the socket connection and re-attempts execution of the semi-privileged instruction. The originated semi-privileged instruction will now work until the association is changed again based on a successful request of a different application process. If the parent process wants to send data again, the originated semi-privileged instruction fails with the appropriate error code and now the parent process requests access to the kernel-level object from the operating system and the above described steps are now repeated for the requesting parent process.

If data needs to be sent from kernel space, the semi-privileged instruction is called from there in context of the socket connection. The semi-privileged instruction will work, since called from kernel space in a privileged context. The semi-privileged instruction will access the data present in the kernel space already. Advantageously there is no need to copy the data into user space first and call the semi-privileged instruction from there.

A representation of the kernel-level object, e.g. the file descriptor, can be used for blocking operations. The blocking operations will work on the kernel-level object. E.g., a poll/select operation will be issued on this kernel-level object from the application process. As soon as the operating system kernel notices state changes, the operating system kernel can wake up the application project through the file descriptor.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of accessing privileged objects in a server environment, the method comprising:
    associating a privileged object with an application, the application comprising at least one process resource and a corresponding semi-privileged instruction, the associating providing an association;
    filing the association in an entity of an operating system kernel;
    based on the corresponding semi-privileged instruction being issued by a process resource of the at least one process resource and attempting to access the privileged object, performing an authorization check, the authorization check comprising accessing the entity to determine authorization of the process resource to access the privileged object; and
    performing processing based on performing the authorization check, wherein based on the authorization check determining authorization failure, the performing processing comprises denying execution of the corresponding semi-privileged instruction and performing a corresponding authorization check failure handling comprising:
        based on a request, to the operating system kernel by the process resource, to access the privileged object, verifying whether any process resource of the at least one process resource has access to the privileged object; and
        based on verifying that any process resource has access to the privileged object, establishing in the entity an association of the process resource with the privileged object; and
    repeating the performing the authorization check and the performing processing based on performing the authorization check.

2. The method of claim 1, wherein based on the authorization check determining a positive authorization, the performing processing comprises executing the corresponding semi-privileged instruction and granting the process resource access to the privileged object.

3. The method of claim 1, wherein the authorization check determines a positive authorization for the process resource to access the privileged object based on any process resource of the at least one process resource having access to the privileged object.

4. The method of claim 1, wherein the privileged object comprises an operating system kernel-level object including at least one of the following components: a socket connection, a disk device or access to an input/output bus, an input/output device or an input/output channel.

5. The method of claim 1, further comprising providing a file descriptor to the application representing a data transfer connection established to be used by the corresponding semi-privileged instruction to transfer data to a target location, wherein a user space library uses the file descriptor for one or more of the following: to block on, select, poll or epoll.

6. A data processing system comprising:
    a memory; and
    a processor in communication with the memory, wherein the data processing system is configured to perform a method comprising:
        associating one or more privileged objects with an application, the application comprising at least one process resource and a corresponding semi-privileged instruction, the associating providing an association;
        filing the association in an entity of an operating system kernel;
        based on the corresponding semi-privileged instruction being issued by a process resource of the at least one process resource and attempting to access the privileged object, performing an authorization check, the authorization check comprising accessing the entity to determine authorization of the process resource to access the privileged object; and
        performing processing based on performing the authorization check, wherein based on the authorization check determining authorization failure, the performing processing comprises denying execution of the corresponding semi-privileged instruction and performing a corresponding authorization check failure handling comprising:
            based on a request, to the operating system kernel by the process resource, to access the privileged object, verifying whether any process resource of the at least one process resource has access to the privileged object; and based on verifying that any process resource has access to the privileged object, establishing in the entity an association of the process resource with the privileged object; and repeating the performing the authorization check and the performing processing based on performing the authorization check.

7. The data processing system of claim 6, wherein based on the authorization check determining a positive authorization, the performing processing comprises executing the corresponding semi-privileged instruction and granting the process resource access to the privileged object.

8. The data processing system of claim 6, wherein the authorization check determines a positive authorization for the process resource to access the privileged object object.

9. The data processing system of claim 6, wherein the privileged object comprises an operating system kernel-level object including at least one of the following components: a socket connection, a disk device or access to an input/output bus, an input/output device or an input/output channel.

10. The data processing system of claim 6, wherein the method further comprises providing a file descriptor to the application representing a data transfer connection established to be used by the corresponding semi-privileged instruction to transfer data to a target location, wherein a user space library uses the file descriptor for one or more of the following: to block on, select, poll or epoll.

11. A computer program product comprising:
a non-transitory computer readable storage medium readable by a processor and storing instructions for execution by the processor for performing a method comprising:

associating one or more privileged objects with an application, the application comprising at least one process resource and a corresponding semi-privileged instruction, the associating providing an association;

filing the association in an entity of an operating system kernel;

based on the corresponding semi-privileged instruction being issued by a process resource of the at least one process resource and attempting to access the privileged object, performing an authorization check, the authorization check comprising accessing the entity to determine authorization of the process resource to access the privileged object; and performing processing based on performing the authorization check, wherein based on the authorization check determining authorization failure, the performing processing comprises denying execution of the corresponding semi-privileged instruction and performing a corresponding authorization check failure handling comprising:

based on a request, to the operating system kernel by the process resource, to access the privileged object verifying whether any process resource of the at least one process resource has access to the privileged object; and based on verifying that any process resource has access to the privileged object, establishing in the entity an association of the process resource with the privileged object; and repeating the performing the authorization check and the performing processing based on performing the authorization check.

12. The computer program product of claim 11, wherein based on the authorization check determining a positive authorization, the performing processing comprises executing the corresponding semi-privileged instruction and granting the process resource access to the privileged object.

13. The computer program product of claim 11, wherein the authorization check determines a positive authorization for the process resource to access the privileged object based on any process resource of the at least one process resource having access to the privileged object.

14. The computer program product of claim 11, wherein the privileged object comprises an operating system kernel-level object including at least one of the following components: a socket connection, a disk device or access to an input/output bus, an input/output device or an input/output channel.

* * * * *